US006986053B1

(12) United States Patent
Schwartz et al.

(10) Patent No.: US 6,986,053 B1
(45) Date of Patent: Jan. 10, 2006

(54) SYSTEM FOR PROTECTING CRYPTOGRAPHIC PROCESSING AND MEMORY RESOURCES FOR POSTAL FRANKING MACHINES

(75) Inventors: Robert Schwartz, Branford, CT (US); George Brookner, Norwalk, CT (US); Edward J. Naclerio, Madison, CT (US)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 0 days.

(21) Appl. No.: 09/297,784

(22) PCT Filed: Nov. 7, 1997

(86) PCT No.: PCT/US97/15856

§ 371 (c)(1),
(2), (4) Date: Jul. 7, 1999

(87) PCT Pub. No.: WO98/20461

PCT Pub. Date: May 14, 1998

Related U.S. Application Data

(60) Provisional application No. 60/030,537, filed on Nov. 7, 1996, provisional application No. 60/050,043, filed on Jun. 18, 1997, provisional application No. 60/054,105, filed on Jul. 29, 1997.

(51) Int. Cl.
*H04L 9/32* (2006.01)

(52) U.S. Cl. ......................... 713/193; 713/194; 380/55

(58) Field of Classification Search ................ 713/174, 713/182–185, 192–194, 200, 155, 168–172, 713/176, 181; 380/55, 51; 705/60, 62, 63, 705/401, 408, 405, 404, 50, 410

See application file for complete search history.

(56) References Cited

U.S. PATENT DOCUMENTS 4,743,747 A 5/1988 Fougere et al.
4,814,591 A 3/1989 Nara et al. .................. 235/380
4,934,846 A 6/1990 Gilham
5,181,245 A * 1/1993 Jones .......................... 705/61
5,218,613 A 6/1993 Serreze et al.
5,343,025 A 8/1994 Usui
5,377,264 A * 12/1994 Lee et al. .................. 713/189
5,389,738 A 2/1995 Piosenka et al.
5,448,641 A * 9/1995 Pintsov et al. ................ 380/51
5,457,746 A 10/1995 Dolphin (Continued)

FOREIGN PATENT DOCUMENTS

WO WO 93/06542 4/1993

OTHER PUBLICATIONS

"Applied Cryptography Second Edition", Bruce Schneier, 1996, p. 587.

*Primary Examiner*—Hosuk Song
(74) *Attorney, Agent, or Firm*—Perman & Green, LLP

(57) ABSTRACT

An improved system for protecting cryptographic processing and memory for postal franking machines. Appropriate cryptographic processing and memory resources are contained in a Postal Security Device (PSD), which defines a cryptographic and physical boundary. Cryptographic processing occurs in the PSD, which provides security to these resources, thereby minimizing a successful fraudulent attack on the system. Speed of the cryptographic processing is also increased. The PSD may be in the form of an Applications Specific Integrated Circuit (ASIC) or Personal Computer Memory Card International Association (PCMCIA) Card.

6 Claims, 3 Drawing Sheets

U.S. PATENT DOCUMENTS

| | | | |
|---|---|---|---|
| 5,517,184 | A | 5/1996 | Dawson et al. |
| 5,535,279 | A | 7/1996 | Seestrom |
| 5,590,198 | A | 12/1996 | Lee et al. |
| 5,602,921 | A | 2/1997 | Ramadei |
| 5,682,427 | A | 10/1997 | Seestrom |
| 5,688,056 | A | 11/1997 | Peyret |

* cited by examiner

SYSTEM FOR PROTECTING CRYPTOGRAPHIC PROCESSING AND MEMORY RESOURCES FOR POSTAL FRANKING MACHINES

RELATED APPLICATIONS

This application claims priority from pending U.S. Provisional Application Ser. Nos. 60/030,537, 60/050,043, and 60/054,105, filed on Nov. 7, 1996, Jun. 18, 1997, and Jul. 29, 1997, respectively, which are hereby incorporated by reference.

TECHNICAL FIELD

This invention is directed to a system for protecting cryptographic processing and memory resources for postal franking machines.

BACKGROUND ART

In countries throughout the world, a postal customer may obtain postage from the postal authority in several ways, including the purchase of stamps and the use of a postage meter. When a postage meter is used, there is a security concern since the meter is dispensing value, and without sufficient security, the value could be stolen from a meter by unscrupulous parties. Concerns include use of the meter to dispense postage for which the Postal Authority has not been compensated and use of the meter which was not authorized by the lawful operator of the meter.

These security concerns have always been present, even when a postage meter was essentially a purely mechanical letterpress. As the postage meter evolved through the 20$^{th}$ century to an electronic configuration, letter-press printing was represented in a rotary drum movement impressing an image onto a mailpiece, as well as a flat-bed approach meshing a mailpiece on a platen assembly against a printing die to produce an image onto a mailpiece. The postage meter is now taking on a new role of digitally printing postage, thus no longer requiring letter-press printing.

When a postage meter utilizes letter-press printing, security concerns are typically addressed, in part, by the physical attributes of the meter. Not only do the attributes of the meter (case material, etc.) provide protection against the unauthorized use of the meter, the attributes also provide a means to detect whether an attempt has been made to make unauthorized use of the meter evidenced by visible deliberate damage to the meter's case. With evolution of the "meter," greater security against fraudulent attacks on the meter is needed. With the increase in the availability of elaborate technologies and sophisticated hacking capabilities, Postal Authorities around the world, including the United States Postal Service, are concerned with the ability to defraud the Postal Authorities by falsifying postal indicium, particularly when such indicium is digitally printed.

One approach which as been taken to increase the security of evolved meters is to employ cryptographics to the creation and application of the postal indicia. In order for this approach to be an effective security measure, however, there must be sufficient physical security for the cryptographic processing and memory to eliminate a successful fraudulent attack on the system. In order for this to be a commercially viable approach, cryptographic processing must be performed in a timely manner.

DISCLOSURE OF THE INVENTION

In accordance with the present invention, there is provided a greatly improved system for protecting cryptographic processing and memory, which also results in faster cryptographic processing. According to the invention, it is provided that the appropriate cryptographic processing and memory resources are contained in a Postal Security Device (PSD). The PSD provides physical security to these resources, thereby eliminating a successful fraudulent attack on the system. The PSD may be in the form of an Applications Specific Integrated Circuit (ASIC) and is preferably mounted on a portable device with an interface such as a Personal Computer Memory Card International Association (PCMCIA) Compliant Card or other form factor capable of supporting the integrity of the PSD.

MODES FOR CARRYING OUT THE INVENTION

Figure 1:
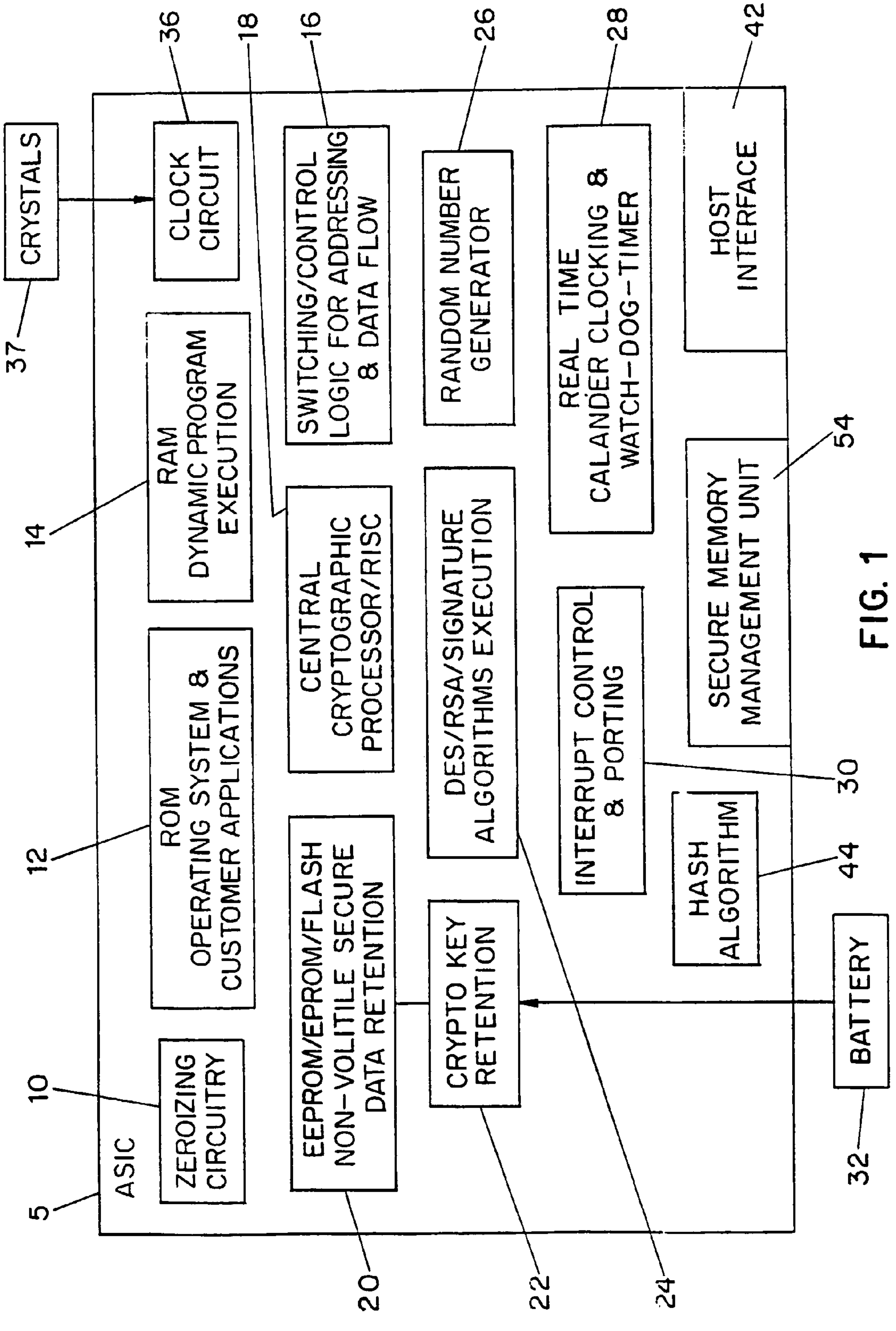
FIG. 1 is a block diagram showing the basic functional makeup of the PSD cryptographic processor in the present invention.

Referring to FIG. 1, an ASIC embodiment of a PSD is shown generally at 5 and includes zeroing circuitry 10, read-only-memory 12, random-access-memory 14, switching/control logic 16, a control cryptographic processor 18, non-volatile memory 20, crypto key retention 22, signature algorithm execution 24, random number generator 26, real time clock 28, interrupt control and porting 30, clock circuit 36, secure hash acceleration circuit 44, secure memory management unit 54, and host interface 44 all within a cryptographic boundary 34. The Random Number Generator 26 within this block provides a source for non-predictable random numbers typically required in systems employing cryptographic technology. The clock circuit 28 is an on-chip realtime clock for secure time keeping. External to the ASIC PSD are a battery 32 for retaining memory contents in the absence of main power to the ASIC, and one or more crystals 37 which provide clock reference timing for the various subcircuits within the ASIC. Such a PSD contains working memory, storage memory, and firmware necessary to execute cryptographic algorithms, within its cryptographic boundary, including, but not limited to DES and RSA encryption, as well as digital signature creation and validation. Information that must be retained, as Master Key, Public Key, Private Key, and the like are secured within a non-volatile memory or battery backed up memory of the PSD. Although the battery and crystals are outside the cryptographic boundary of the ASIC in this embodiment, these components can be also integrated into the same package as the ASIC silicon die.

The ASIC provides physical security to the data stored thereon as the circuits are inaccessible without destroying circuit operation. The secure data stored on an ASIC includes data encryption keys which cannot be extracted or modified without destroying PSD operation. The encryption engine 24 includes the capability of receiving data, processing the received data by performing encryption or decryption operations.

The individual components of the ASIC may also be integrated within a PCMCIA Card, or preferably the custom integrated circuit (ASIC) is further integrated and embodied as a PCMCIA Card. The PCMCIA Card provides additional physical security through its housing for the processing unit for the storage and accounting of all funds, audit and secure support data required to produce and validate the addition and removal of postage value. As described above, one of the preferred embodiments encloses the ASIC or it components in a PCMCIA card. More generally, the invention contemplates enclosing the ASIC or its components in any package having a relatively small form factor. For example, any form factor that is more or less pocket-sized or that is more or less capable of being mailed in an envelope will be convenient. Such a package must necessarily have a communications port capable to interfacing with the postal franking device and a host, discussed below, preferably a parallel data and address bus such as is employed in a PCMCIA card. Alternatively the port could be a serial bus such as a high-speed universal serial bus. If the application does not require high speed, an infrared (LED-phototransistor) link may be used. Said secure processing unit contains working memory, storage memory, and firmware necessary to execute cryptographic algorithms, within a cryptographic boundary, including but not limited to DES and RSA, as well as digital signature creation and validation. Information which must be retained, such as Master Keys, Public Keys, Private Keys, and the like are secured within a non-volatile memory or battery backed up memory.

The security of the PSD implemented in a PCMCIA Card is a combination of data integrity, authentication, non-repudiation, and confidentiality. Data integrity is realized through the use of cryptographic checksums (one-way hashes) over the data. This function produces a small value that uniquely represents the data, such that if any single bit is altered the hash value changes significantly. The digital signature is obtained by performing a cryptographic operation on the resultant hash of the data. Authentication is realized by the fact that the receiving party can verify the digital signature on a transmission and be assured the transmission was originated by a trusted source and not other fraudulent parties. Non-repudiation is achieved by the fact that the originator of the message cannot deny the message contents as it is possible to generate the verifiable digital signature only with the originator's unique private key. Confidentiality is the use of encryption to protect the data from unauthorized disclosure.

To ensure operational security, the PSD cannot operate as a standalone device and requires a host system to perform its functions. The PSD typically communicates directly with a host system to carry out its primary objective of indicia creation. Additionally, through the host system a user can access the PSD to review the ascending and descending register values, piece count, watchdog timeout date, and refill history logs; activate PSD diagnostics; and with proper supervisor authorization, set up and delete PINs for individual users. The PSD may also provide the user with certain operational error messages such as a low-postage warning and watchdog timeout condition through the host user interface. The host system may also maintain certain log files; these log files are required to be signed by the PSD with its private key. The host system will transfer the data to sign to the PSD and the PSD will return a digital signature and a certificate (which contains the public key which is unique to the PSD) that can be used later to verify the digital signature.

The PSD supports input and output functions with appropriate interfacing devices compatible with the PSD physical, link layer, and application protocols. Due to the secure nature of the PSD, the device does not provide user accessible diagnostic features. Rather, the PSD has an extensive built-in self test suite which is run upon power up. The tests preferably include the normal code memory verification tests, RAM tests, verification of accounting register and data log integrity, and execution of sample cryptographic calculations with known results to verify full functionality of the PSD. Upon successful completion of these tests, the PSD will be enabled to dispense postage funds. If any of the tests fail, the PSD will output its current ascending register and descending values. The host may also obtain the same information via a device audit request message. This will provide the host with additional information which may be forwarded to a Host infrastructure for the purposes of auditing the PSD. Upon the receipt and verification of a Host infrastructure-generated device audit message, preferably the PSD will reset its internal watchdog timer to accommodate control and transaction date information.

It is understood by one skilled in the art that the PSD of the present invention need not be physically located with the postal franking device; it only need be in communication with the postal franking device. For example, it may be located on the host or a computer network. In the instance of the PSD including a PCMCIA Card, the PSD may be connected to the franking device for operation and then disconnected and connected to the host for creation of the log files, etc., through a standard PCMCIA slot.

Figure 2:
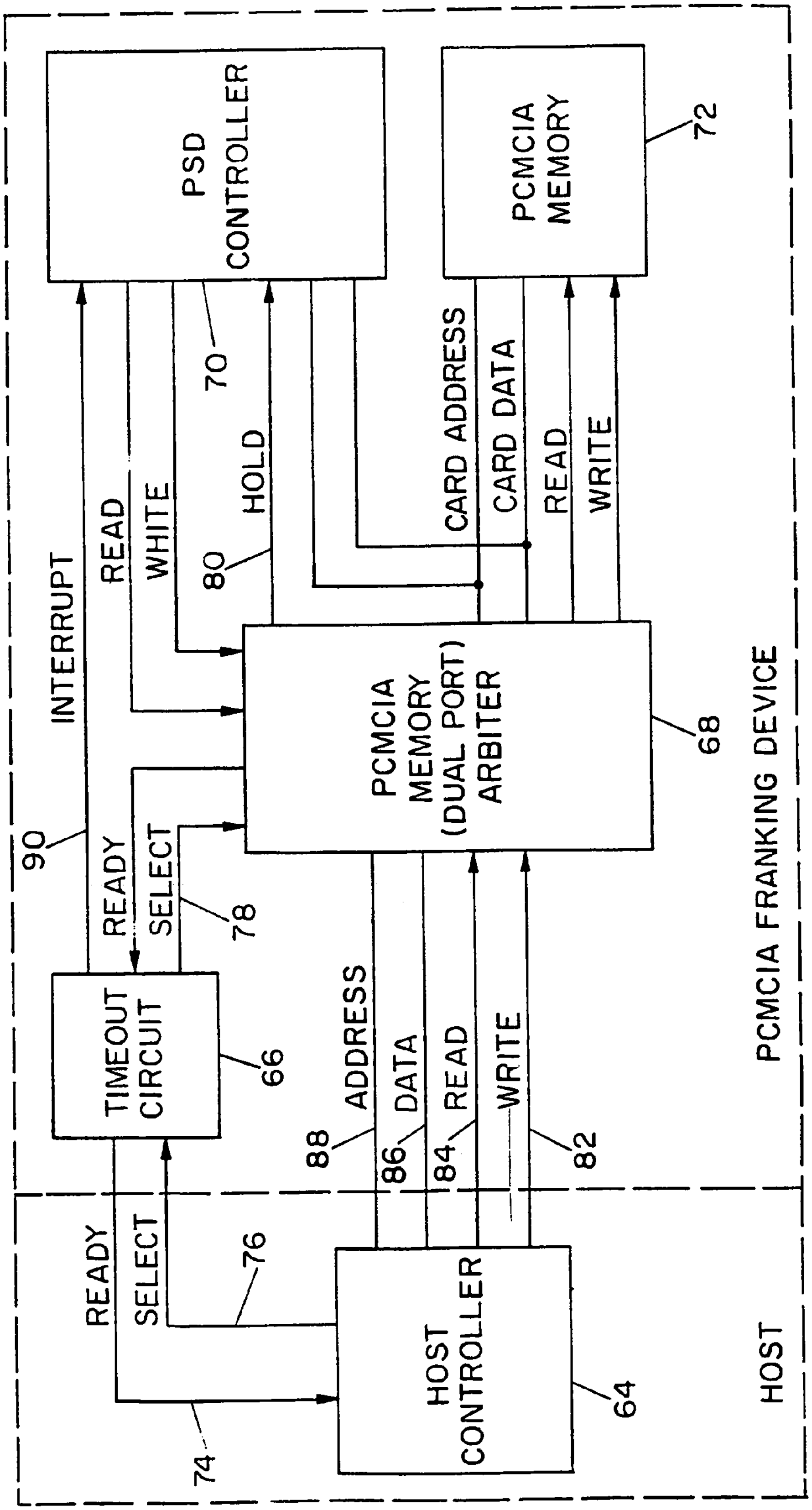
FIG. 2 is a block diagram of the PCMCIA Card PSD of the present invention.

Referring now to FIG. 2, a block diagram of the embodiment of the PCMCIA Card PSD of the present invention interfacing with a host controller is shown, including host controller 64, timeout circuit 66, memory arbiter 68, controller 70, and memory 72. It is envisioned that a number of forms of attack can be executed against the PCMCIA Card PSD wherein an attacker attempts to obtain additional data from the PSD, or otherwise compromise its integrity, by holding the bus for an excessive period of time. Timeout circuit 66 operates to limit the amount of time host controller 64 may have to complete a bus transaction, and will terminate a host-initiated bus transaction if the transaction exceeds a predetermined time limit.

When host 64 wishes to access the PSD implemented in a PCMCIA Card, it waits until read signal 74 is asserted and then asserts select signal 76. This signal is input to timeout circuit 66, which initiates a predetermined timeout interval. Host controller 64 then initiates a read or write cycle by asserting the appropriate read and write signals and setting up the address and data busses accordingly.

Timeout circuit 66 provides a separate select signal 78 to memory arbiter 68, which is effectively a dual port memory controller containing logic which defines conditions under which controller 70 and host controller 64 have access to memory 72. When host controller 64 has access to memory 72, arbiter 68 asserts a hold signal 80 to controller 70, which tells controller 70 to temporarily hold off any further accesses of memory 72. Under these circumstances, controller 70 is typically idle unless it is performing an internal operation not requiring an external memory access.

Arbiter 68 allows read and write signals 82 and 84, as well as address and data busses 86 and 88, to pass onto memory 72. Following a successful bus transaction, host controller 64 deasserts select signal 74 to timeout circuit 66 to indicate the normal end of the bus transfer. Timeout circuit 66 likewise deasserts select signal 78 to arbiter 68, which removes host controller's signal levels on the read, write, address and data busses (82, 84, and 86) to memory 72 and signals the controller 70 that it can access memory 72 by deasserting hold signal 80.

If host controller 64 takes too long to complete the bus access, timeout circuit 66 deasserts ready signal 74 to the host controller and select signal 78 to arbiter 68. This causes arbiter 68 to remove host controller's 64 read (84), write (82) address (88) and data (86) signals from memory 72. Hold signal 80 to controller 70 is released to controller 70 can again access memory 72. Alternatively, timeout circuit 66 could also signal controller 70 that the fault occurred by asserting interrupt signal 90 to that device. Logic in the controller 70's software could be invoked to categorize the problem as a random fault or an attempt to compromise the PSD. If controller 70 determines tampering has been attempted, the controller would refuse further host controller 64 accesses and force the customer to report the situation to the manufacturer, for example, remotely through a telephone call or other network communication or by returning the device.

A preferred embodiment of the PSD implemented on a PCMCIA Card would restrict the area in memory 72 that host controller 64 can access. For example, access can be limited to no access, read-only, write-only, read-write, etc., and the address range in memory 72 can be restricted to a subset available to controller 70. In this manner, controller 70 can hide certain information, such as its most critical security parameters, from both observation or overwriting.

Host interface 42 incorporates timeout circuit 66, PCMCIA memory arbiter 68, and PSD controller 70. Controller 70 corresponds to crypto processor 18 in FIG. 1. Timeout circuit 66 and arbiter 68 would thus preferably be incorporated into the PSD ASIC but may be added as discrete circuits on the PCMCIA card.

The PSD of the present invention may be used with existing public/private key cryptographical techniques known in the art. See, for example, U.S. Pat. Nos. 5,237,506, 5,606,507 and 5,666,284, which are hereby incorporated by reference. The speed with which such encryption is performed, however, may be increased by the use within the PSD of a Secure Memory Management Unit 96 (SMMU). Preferably, this is obtained from Atalla Corp., of San Jose, Calif., which is a Tandem Company, and VLSI Technology, of San Jose, Calif.

Figure 3:
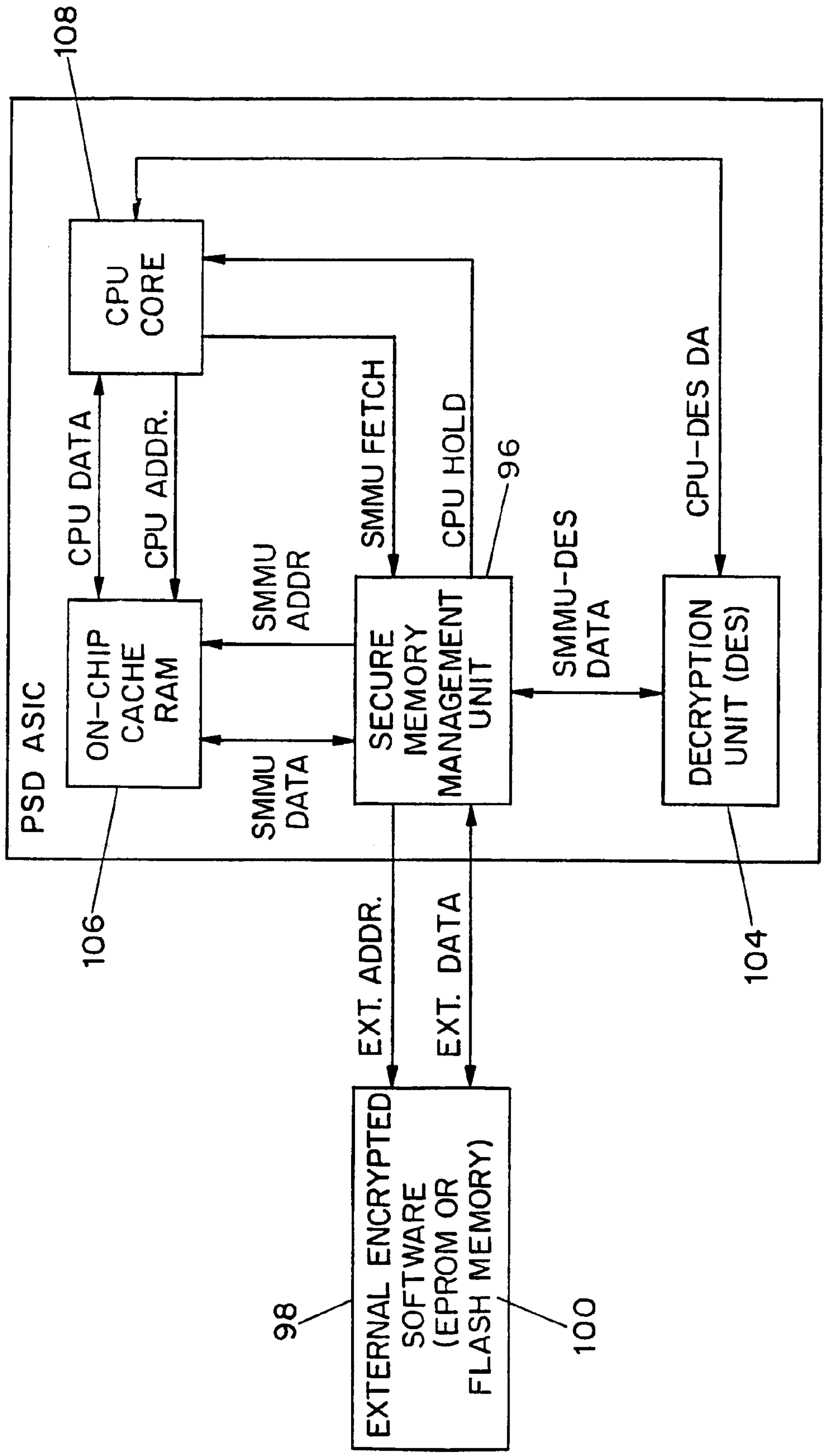
FIG. 3 is a block diagram showing the PSD of the present invention operating in secure high speed instruction cache operation.

As shown in FIG. 3, Memory 98 external to the PSD contains encrypted code. SMMU 96 obtains the encrypted code 100 in portions to be processed by encryption engine 104, is such a manner that it acts as a feed for encryption engine 104. The encryption engine 104 utilizes the appropriate decryption key provided to it by the SMMU 96. This decryption key is securely stored in the PSD ASIC and is never output and so is never known to a potential attacker. The decrypted output from encryption engine 104 is then placed into RAM 106 (also 14 in FIG. 1). FIG. 3 shows the output of RAM 106 going to processor 108 (also 18 in FIG. 1). Thus, FIG. 3 depicts secure high speed instruction cache operation. The overall benefit of the SMMU is realized by the fact that a would-be attacker cannot substitute software instructions into the code to alter the intended functionality and that could give the attacker access to the master, private, or public keys held within the PSD ASIC.

While there have been described what are believed to be the preferred embodiments of the invention, those skilled in the art will recognize that other and further modifications may be made thereto without departing from the invention and it is intended to claim all such changes and modifications as fully within the scope of the invention.

We claim:

1. A postal security device in the form of an application specific integrated circuit for providing cryptographic resources for a postal franking system comprising:

a processor for controlling the use and functions of said cryptographic resources;

a memory for securely storing data for use with said cryptographic resources;

a communications bus for communicating with a host computer to allow use of said cryptographic resources;

a timing circuit for sensing the amount of time the host computer is taking to complete a bus transaction, comparing said amount of time with a predetermined time, and generating a signal when said sensed time exceeds said predetermined time;

a memory controller for controlling access to said memory, said memory controller constructed to receive said signal and to terminate said bus transaction.

2. A postal security device, as described in claim 1, wherein said application specific integrated circuit is embodied in a PCMCIA card.

3. A postal security device, as described in claim 1, wherein said memory is not accessible and a further accessible memory is provided to store accounting, identification, and operational history data for a user.

4. A postal security device, as described in claim 1, wherein said cryptographic algorithms generate a check sum representation of generated data to provide a unique digital signature which may be verified by a user.

5. A postal security device, as described in claim 1, further comprising means for cooperative operation with a secure memory management unit in said host computer to isolate the cryptographic processor and prevent tampering with the cryptographic resources.

6. A postal security device, as described in claim 1, further comprising a non-accessible self test processor to perform analysis for the purpose of verifying full functionality of the postal security device.

* * * * *